United States Patent Office 3,826,661
Patented July 30, 1974

3,826,661
HIGH INDEX OPTICAL GLASS
Edgar Joseph Greco and James Matthew Wylot, Rochester, N.Y., assignors to Eastman Kodak Company, Rochester, N.Y.
No Drawing. Filed Sept. 5, 1972, Ser. No. 286,498
Int. Cl. C03c 3/10
U.S. Cl. 106—53
2 Claims

ABSTRACT OF THE DISCLOSURE

An optical glass having a high index of refraction and low absorption in the visible region of the spectrum comprising lead oxide (PbO), tellurium dioxide ($TeO_2$), and at least one material selected from the group consisting of silicon dioxide ($SiO_2$), germanium dioxide ($GeO_2$) and boric oxide ($B_2O_3$). Glasses according to the invention may also include amounts of aluminum oxide ($Al_2O_3$), arsenic pentoxide ($As_2O_5$), titanium dioxide ($TiO_2$), sodium chloride (NaCl), sodium oxide ($Na_2O$), lithium oxide ($Li_2O$), lithium chloride (LiCl) and/or potassium fluoride (KF).

CROSS REFERENCE TO RELATED APPLICATIONS

Reference is made to commonly assigned copending U.S. Patent Application Ser. No. 286,497, filed Sept. 5, 1972, in the names of James Matthew Wylot and Edgar Joseph Greco; and to commonly assigned copending U.S. Patent Application Ser. No. 286,499, filed Sept. 5, 1972, in the names of James Matthew Wylot and Edgar Joseph Greco.

BACKGROUND OF THE INVENTION

Field of the Invention

This invention relates to optical glasses, and in particular to optical glasses having a high index of refraction and low absorption in the visible region of the spectrum.

Description of the Prior Art

It is well known in the glass and lens making arts that optical glasses having a high index of refraction and low absorption in the visible region of the spectrum would be of great utility in photographic systems. A high index of refraction permits reduction in the curvature required in a lens element to produce a desired optical performance, thereby making production of a lens simpler and less expensive and permitting production of otherwise impractical lenses. Low absorption in the visible region of the spectrum, i.e. low color, is desirable in a photographic lens since it permits satisfactory exposure with lower ambient illumination and because distortion of the scene color by the lens system is minimized.

Flint glasses have long been known which are characterized by a high index, that is, an index of refraction in excess of 1.8. However, these glasses have also been characterized by high color. For example, J. E. Stanworth has formed flint glasses having a high index in the lead-tellurium system but each glass has a light yellow color which makes it unsuitable for use in most photographic systems, see J. E. Stanworth, *Tellurite Glasses, Journal of the Society of Glass Technology*, Vol. 36, 1952, pgs. 217–241.

SUMMARY OF THE INVENTION

An object of the present invention is to provide an optical glass having low absorption in the visible region of the spectrum.

Another object is to provide such an optical glass having a high index of refraction.

Another object is to provide such an optical glass which can be economically produced under manufacturing conditions.

Another object is to provide such an optical glass which is durable.

It has been found that these and other objects are accomplished according to the present invention by the addition of tellurium dioxide to flint glasses, resulting in optical glasses comprising, by weight percent, 10–81% lead oxide (PbO), 4–80% tellurium dioxide ($TeO_2$) and 2–50% of at least one material selected from the group consisting of boric oxide ($B_2O_3$), silicon dioxide ($SiO_2$) and germanium dioxide ($GeO_2$). Other embodiments include the addition of amounts of aluminum oxide ($Al_2O_3$), arsenic pentoxide ($As_2O_5$), titanium dioxide ($TiO_2$), sodium chloride (NaCl), sodium oxide ($Na_2O$), lithium oxide ($Li_2O$), lithium chloride (LiCl) and/or potassium fluoride (KF).

DETAILED DESCRIPTION OF THE PREFERRED EMBODIMENTS OF THE INVENTION

In previous studies of tellurite glasses, the glasses have been characterized by high color. J. E. Stanworth has theorized that the yellow color is due to iron and other impurities in the tellurium dioxide with other colors being produced by the third component introduced into the system. We have found that the use of tellurium dioxide having substantially reduced amounts of iron impurities does reduce the color of the resultant glasses. However, we have also discovered that tellurium dioxide appears to act as a color reducing agent in lead containing glasses, in that substituting increased amounts of tellurium dioxide for lead oxide in a particular system results in further reductions in color absorption. Moreover, we have discovered that tellurium possesses color reducing properties in lead containing glasses containing either silicon dioxide, germanium dioxide or boric oxide as a third component, as well as in systems incorporating other components as additional elements.

Flint glasses, with tellurium substituted for lead, exhibit other desirable properties in addition to reduced color absorption. In general, as the amount of tellurium is increased, the density of the glass, volatilization and tendency of the melt to crystallize decrease. A decrease in density results in more lenses being produced from a pound of melt and thus reduces the unit cost of each lens. Less volatilization improves the striae quality of the glass and, in addition, results in a more uniform refractive index for different melts of the same composition. A reduced tendency to crystallization increases the probability that useful glass will be produced from a particular melt. In addition, as the amount of tellurium is increased, the viscosity of the melt and durability of the glass generally increase. An increase in viscosity indicates a possible structural change in the melt which generally reduces corrosion of the crucible. An increase in durability permits the glass to be utilized in a wider range of environmental conditions and commercial products. All of these general changes which result from substituting tellurium for lead in a particular glass system are beneficial in producing glasses under manufacturing conditions.

The present invention provides optical glasses which are extremely well suited for lenses or optical systems of the type used in photographic equipment. By way of example, optical glasses having a high index of refraction and low color absorption have been produced from melts having the compositions by weight percent listed in the following tables. Table I illustrates examples of glass compositions in which boric acid ($B_2O_3$) has been added to tellurium dioxide ($TeO_2$) and lead oxide ($PbO$), in melts which were fired in gold crucibles at a temperature in the range from 800–950° C.

TABLE I

| Melt | $TeO_2$ | PbO | $B_2O_3$ | $n_S$ |
|---|---|---|---|---|
| 101b' | 10.65 | 69.10 | 20.25 | 1.92 |
| 104a | 20.00 | 60.00 | 20.00 | 1.81 |
| 104b | 10.00 | 80.00 | 10.00 | 2.02 |
| 104c | 10.00 | 60.00 | 30.00 | 1.83 |
| 104d | 20.00 | 70.00 | 10.00 | 2.04 |
| 105a | 30.00 | 50.00 | 20.00 | 1.87 |
| 105c | 40.00 | 40.00 | 20.00 | 1.88 |
| 105d | 40.00 | 50.00 | 10.00 | 2.00 |
| 106a | 50.00 | 30.00 | 20.00 | 1.86 |
| 106b | 50.00 | 40.00 | 10.00 | 2.00 |
| 106c | 60.00 | 20.00 | 20.00 | 1.84 |
| 106d | 60.00 | 30.00 | 10.00 | 1.87 |
| 107a | 70.00 | 10.00 | 20.00 | 1.87 |
| 107b | 70.00 | 20.00 | 10.00 | 1.99 |
| 107c | 80.00 | 10.00 | 10.00 | 1.96 |
| J7* | 55.00 | 30.00 | 15.00 | 1.96 |
| J1a | 30.00 | 40.00 | 30.00 | 1.79 |
| J1b | 20.00 | 50.00 | 30.00 | 1.81 |

Each of these glasses is characterized by a high index of refraction, all having an index in excess of 1.81. Each of these glasses is also characterized by low color absorption when compared visually with available high index glasses and, with representative melts, when compared in measured transmittance at selected wavelengths with the transmittance of available glasses.

It has been found that, in the production of optical glasses according to this invention, a harder and more durable glass may be produced by the addition of up to fifteen (15) percent aluminum oxide ($Al_2O_3$) and/or up to five (5) percent titanium dioxide ($TiO_2$) to the tellurium-lead boron system. Table II illustrates glasses made with the introduction of one or both of these components; the melts being fired in gold crucibles at a temperature in the range from 760–950° C.

TABLE II

| Melt | $TeO_2$ | PbO | $B_2O_3$ | $TiO_2$ | $Al_2O_3$ | $n_D$ |
|---|---|---|---|---|---|---|
| 101 | 10.75 | 66.00 | 20.25 | 3.00 | | 2.02 |
| 102a | 10.44 | 67.75 | 19.85 | | 1.96 | |
| 102d | 10.14 | 65.81 | 19.29 | | 4.76 | 1.86 |
| 103c | 9.68 | 62.82 | 18.41 | | 9.09 | 1.87 |
| 109a | 10.00 | 60.00 | 20.00 | | 10.00 | 1.83 |
| 109b | 30.00 | 40.00 | 20.00 | | 10.00 | 1.81 |
| J6* | 60.00 | 20.00 | 10.00 | | 10.00 | 1.86 |
| J9* | 70.00 | 13.00 | 15.00 | 2.00 | | 1.94 |
| J4e | 60.00 | 10.00 | 10.00 | 5.00 | 15.00 | 1.96 |
| J4f | 60.00 | 20.00 | 10.00 | 5.00 | 5.00 | 1.93 |
| J5a | 40.00 | 35.00 | 20.00 | 5.00 | | 1.89 |
| J8a | 10.00 | 70.00 | 15.00 | 5.00 | | 2.00 |
| J8b | 10.00 | 65.00 | 20.00 | 5.00 | | 1.94 |
| J8c | 10.00 | 68.00 | 20.00 | 2.00 | | 1.91 |
| J10g | 65.00 | 20.00 | 5.00 | | 10.00 | 1.93 |
| J10h | 64.00 | 20.00 | 6.00 | | 10.00 | 1.90 |
| J10i | 60.00 | 25.00 | 5.00 | | 10.00 | 1.89 |
| J11g | 68.00 | 13.00 | 15.00 | 4.00 | | 1.95 |
| J9 | 70.00 | 13.00 | 15.00 | 2.00 | | 1.96 |

Each of the above melts also contained arsenic pentoxide ($As_2O_5$) as an oxidizer in an amount no more than 2% by weight, except for melts 101, 102a, 102d, and J5a. It is believed that deletion of this component would result in little change in the optical qualities of the resulting glass compositions.

Table III illustrates examples of glass compositions in which silicon dioxide has been added to the lead-tellurium system. These glasses were fired in gold crucibles at a temperature in the range from 850° C. to 980° C. with the exception of melt 71A which was fired at 1100° C. in a platinum crucible and melt 75D which was fired at 1280° C. in an aluminum oxide crucible.

TABLE III

| Melt | PbO | $TeO_2$ | $SiO_2$ | $n_D$ | $V_D$ |
|---|---|---|---|---|---|
| 64A | 77.05 | 5.36 | 17.59 | 1.964 | 19.8 |
| 64B | 80.15 | 5.08 | 14.77 | 2.007 | 18.5 |
| 71A | 64.82 | 16.80 | 18.38 | 1.93 | |
| 71B | 77.69 | 9.85 | 12.46 | >2.09 | |
| 71C | 75.37 | 14.34 | 10.29 | >2.09 | |
| 72B | 73.20 | 18.56 | 8.24 | >2.09 | |
| 72C | 71.13 | 22.55 | 6.32 | >2.09 | |
| 73B | 69.19 | 26.32 | 4.49 | >2.09 | |
| 73C | 69.08 | 19.76 | 11.16 | >2.09 | |
| 73D | 67.35 | 29.89 | 2.76 | >2.09 | |
| 74A | 65.07 | 27.92 | 7.01 | >2.09 | |
| 75A | 75.97 | 20.89 | 3.14 | >2.09 | |
| 75D | 61.45 | 12.55 | 26.00 | 1.79 | |
| J116 | 71.07 | 10.95 | 17.98 | 1.944 | 20.5 |

Each of these glasses is characterized by a high index of refraction, all but one having an index in excess of 1.93. These glasses are also characterized by low color absorption, both visually and, for representative melts, when measured at selected wavelengths.

It has been found that, in the production of optical glasses in the tellurium-lead-silicon system, additional decreases in color absorption may be achieved by the addition of certain alkali halides, in particular sodium chloride (NaCl), potassium fluoride (KF) and/or lithium chloride (LiCl) but with a concurrent reduction in durability. Glasses of the following weight compositions including PbO, 70–77%; $TeO_2$, 4–11%; $SiO_2$, 14–18%; NaCl, 0.1–5%; LiCl, 0.1–5%; have accordingly been made with the introduction of one or more of these components in melts which have been fired in gold crucibles at a temperature in the range from 900–950° C.

TABLE IV

| Melt | PbO | $TeO_2$ | $SiO_2$ | NaCl | LiCl | KF | $n_D$ | $V_D$ |
|---|---|---|---|---|---|---|---|---|
| J110 | 76.71 | 4.00 | 14.44 | 4.85 | | | 1.960 | 18.9 |
| J114 | 70.71 | 10.00 | 14.44 | 4.85 | | | | |
| J106 | 76.71 | 4.00 | 14.44 | 1.00 | 3.85 | | 1.968 | 19.3 |
| J107 | 74.71 | 6.00 | 14.44 | 1.00 | 3.85 | | 1.948 | 19.8 |
| J108 | 76.71 | 4.00 | 14.44 | | 4.85 | | 1.980 | 19.0 |
| J109 | 72.71 | 8.00 | 14.44 | 1.00 | 3.85 | | 1.960 | 19.7 |
| J136C | 76.71 | 4.00 | 14.44 | | | 4.85 | 1.94 | |
| 812 | 71.33 | 10.96 | 17.21 | 0.25 | 0.25 | | 1.949 | 20.36 |

Table V illustrates examples of glass compositions in which germanium dioxide ($GeO_2$) has been added to the lead-tellurium system. Glasses of the following weight composition have been made in melts which were fired in gold crucibles at a temperature in the range from 800–950° C.

TABLE V

| Number | PbO | $TeO_2$ | $GeO_2$ | $n_D$ |
|---|---|---|---|---|
| 134–C | 60 | 20 | 20 | 2.04 |
| 134–d | 50 | 30 | 20 | 2.05 |
| 134e | 50 | 40 | 10 | 2.04 |
| 134f | 40 | 40 | 20 | 2.04 |
| 134i | 70 | 10 | 20 | >2.11 |
| 134J | 70 | 20 | 10 | >2.11 |
| 134K | 60 | 30 | 10 | >2.11 |
| 134L | 40 | 50 | 10 | >2.11 |
| 134M | 30 | 60 | 10 | 2.133 |
| 134A–A | 50 | 20 | 30 | 2.06 |
| 134FF | 40 | 10 | 50 | 1.86 |
| 134HH | 50 | 10 | 40 | 1.90 |
| 17D | 10.92 | 70.89 | 18.19 | 2.05 |
| 101A | 9.66 | 62.72 | 27.62 | 2.06 |

Each of these glasses is characterized by a high index of refraction, all having an index in excess of 1.86. These glasses are also characterized by low color absorption, both visually and, for representative melts, when measured at selected wavelengths.

It has also been found that glasses produced from lead-tellurium melts to which combinations of $B_2O_3$, $SiO_2$ and $GeO_2$ are added, as well as oxides of other components, are also characterized by a high index of refraction and reduced color absorption. Table VI illustrates examples of such melts which were fired in gold crucibles at temperatures in the range from 800–950° C.

TABLE VI

| Number | TeO$_2$ | PbO | B$_2$O$_3$ | SiO$_2$ | GeO$_2$ | Na$_2$O | Li$_2$O | $n_D$ | $V_D$ |
|---|---|---|---|---|---|---|---|---|---|
| J16a | 10.92 | 70.89 | 6.07 | 12.12 | | | | 1.94 | |
| J16b | 10.92 | 70.89 | | 12.12 | 6.07 | | | 1.99 | |
| J16c | 10.92 | 70.89 | | 6.05 | 12.14 | | | 2.04 | |
| J16d | 10.92 | 70.90 | 6.06 | 6.06 | 6.06 | | | 1.99 | |
| J17a | 10.92 | 70.89 | 12.12 | | 6.07 | | | 1.97 | |
| J17b | 10.92 | 70.89 | 12.12 | 6.07 | | | | 1.95 | |
| J17c | 10.92 | 70.89 | 6.05 | | 12.14 | | | 2.02 | |
| 135A | 9.7 | 57.7 | | 5.00 | 27.6 | | | 1.93 | |
| 135B | 9.7 | 62.7 | | 5.00 | 22.6 | | | 1.96 | |
| 135I-11 | 9.7 | 64.7 | | 13.00 | 7.6 | 6.0 | | 1.9106 | 19.60 |
| 135I-11A | 9.2 | 61.6 | | 17.2 | 6.8 | 5.2 | | 1.863 | 21.60 |
| 135R | 9.7 | 62.7 | | 10.00 | 17.6 | | | 1.948 | 20.52 |
| 4B-195 | 13.39 | 65.76 | 8.73 | 7.05 | | 3.04 | 2.03 | 1.9127 | 20.03 |

By way of more specific illustration of practice of this invention, the following examples describe, in detail, the process used to produce each glass.

EXAMPLE I

In the tellurium-lead-boron system, a sample of melt 4B-195 was prepared from the following components:

| Component | Weight (gms.) |
|---|---|
| PbO | 1972 |
| TeO$_2$ | 402 |
| H$_3$BO$_3$ | 465 |
| SiO$_2$ | 212 |
| Na$_2$CO$_3$ | 156 |
| Li$_2$CO$_3$ | 151 |

The TeO$_2$, Na$_2$CO$_3$ and Li$_2$CO$_3$ were blended together in a twin-shell blender for thirty minutes as were the PbO, H$_3$BO$_3$ and SiO$_2$. The former mixture was then fired at 850° C. for thirty minutes in a gold crucible. The remaining mixture was then added and firing was continued for an additional two hours. Stirring was then begun using a three-bladed, three tiered gold stirrer rotated at 200 r.p.m. After 15 minutes of stirring, the firing temperature was reduced to 750° C. and maintained at that temperature for one hour and 15 minutes. The glass melt was then cast onto a cast iron hotplate, which was maintained at a temperature of 130° C. Subsequently, the glass melt was annealed at a temperature of 300° C. to remove any remaining strain on the glass. As indicated in Table VI, the resultant glass has an index of refraction of 1.9127, an Abbe number of 20.03 and the following composition by weight percent:

| Component | Weight (Percent) |
|---|---|
| TeO$_2$ | 13.39 |
| PbO | 65.76 |
| B$_2$O$_3$ | 8.73 |
| SiO$_2$ | 7.05 |
| Na$_2$O | 3.04 |
| Li$_2$O | 2.03 |

EXAMPLE II

In the tellurium-lead-silicon system, a sample of melt 812 was prepared from the following components:

| Component | Weight (gms.) |
|---|---|
| PbO | 5735 |
| TeO$_2$ | 881 |
| SiO$_2$ | 1384 |
| LiCl | 20 |
| NaCl | 20 |

The components were blended together in a twin-shell blender for a period of thirty minutes. The melt was then fired for three hours in a gold crucible at a temperature of 950° C. Stirring was now begun with a three-bladed, three-tiered gold stirrer at 200 r.p.m. After stirring for a period of one hour, the temperature of the melt was reduced to 850° C. and stirring was continued for three more hours. The glass was then cast onto a cast iron hotplate maintained at a temperature of 270° C. and subsequently was annealed at a temperature of 375° C. As indicated in Table IV, the resultant glass has an index of refraction of 1.949, an Abbe number of 20.36 and the following composition by weight percent:

| Component | Weight (gms.) |
|---|---|
| PbO | 71.33 |
| TeO$_2$ | 10.96 |
| SiO$_2$ | 17.21 |
| NaCl | 0.25 |
| LiCl | 0.25 |

EXAMPLE III

In the tellurium-lead-germanium system, a sample of melt 135I-11A was prepared from the following components:

| Component | Weight (gms.) |
|---|---|
| PbO | 1294 |
| TeO$_2$ | 193 |
| GeO$_2$ | 142 |
| SiO$_2$ | 360 |
| Na$_2$CO$_3$ | 188 |

The TeO$_2$ and Na$_2$CO$_3$ were blended together in a twin-shelled blender for a period of thirty minutes as were the PbO, GeO$_2$ and SiO$_2$. The former mixture was then fired in a gold crucible at a temperature of 900° C. for one hour. The remainder of the mixture was then added and firing continued for an additional period of forty minutes at 900° C. Stirring was then begun with a three-bladed, three-tiered gold stirrer at 200 r.p.m. After ten minutes, stirring was halted for thirty minutes. Stirring was again commenced and continued for fifteen minutes at which time the crucible temperature was reduced to 800° C. and stirring continued for a period of thirty minutes. The glass was then cast onto a cast iron hotplate maintained at a temperature of 150° C. and subsequently annealed at a temperature of 290° C. As indicated in Table VI, the resultant glass has an index of refraction of 1.863, an Abbe number of 21.60 and the following composition by weight percent:

| Component | Weight (Percent) |
|---|---|
| PbO | 61.6 |
| TeO$_2$ | 9.2 |
| GeO$_2$ | 6.8 |
| SiO$_2$ | 17.2 |
| Na$_2$O | 5.2 |

The following table illustrates the reduced color absorption achieved with glass compositions according to this invention, by comparing transmittance at three different wavelengths through 10 mm. sections of glass compositions according to this invention and through a 10 mm. section of a commercially available flint glass having approximately the same $n_D$ and $V_D$ as melt J116.

| Sample | Table | 400 m$\mu$ | 450 m$\mu$ | 500 m$\mu$ |
|---|---|---|---|---|
| 101b' | I | 60% | 79% | 81% |
| J116 | III | 50% | 79% | 81% |
| 134HH | V | 70% | 81% | 81% |
| Prior art | | 15% | 67% | 79% |

It may be seen that each of these new glasses exhibits significantly reduced absorption at all measured wavelengths. It is believed that these three new glasses are representative of all of the disclosed glasses and that all would exhibit reduced absorption of the measured wavelengths. This transmission data was obtained by measurement with uncoated samples. Thus, it ignores the effect of reflection losses from the surfaces of each sample, which would account for a loss of approximately 20 percent. Thus, when properly coated in a conventional manner, each sample would have transmittance which would approach 100 percent.

This invention has been described in detail with particular reference to the preferred embodiments thereof but it will be understood that variations and modifications can be effected within the spirit and scope of the invention.

We claim:

1. Optical glasses consisting essentially of components in the following range of percentages by weight:

| Component | Weight Percent |
|---|---|
| Lead oxide (PbO) | 70–77 |
| Tellurium dioxide ($TeO_2$) | 4–11 |
| Silicon dioxide ($SiO_2$) | 14–18 |
| Sodium chloride (NaCl) | 0.10–5 |
| Lithium chloride (LiCl) | 0.10–5 |

2. An optical glass consisting of components having the following weight percents:

| Component | Weight Percent |
|---|---|
| Lead oxide (PbO) | 71.33 |
| Tellurium dioxide ($TeO_2$) | 10.96 |
| Silicon dioxide ($SiO_2$) | 17.21 |
| Sodium chloride (NaCl) | 0.25 |
| Lithium chloride (LiCl) | 0.25 |

References Cited

UNITED STATES PATENTS

| | | | |
|---|---|---|---|
| 3,649,311 | 3/1972 | Araujo | 106—54 |
| 3,486,914 | 12/1969 | Janakirama-Rao | 106—47 R |
| 3,420,683 | 1/1969 | Ikeda et al. | 106—47 R |
| 2,673,809 | 3/1954 | Weissenberg et al. | 106—47 R |
| 1,607,817 | 11/1926 | Dennis | 106—47 R |
| 2,763,559 | 9/1956 | Weissenberg et al. | 106—47 R |

FOREIGN PATENTS

| | | | |
|---|---|---|---|
| 736,703 | 8/1955 | Great Britain | 106—47 Q |
| 270,216 | 5/1970 | U.S.S.R. | 106—47 Q |
| 214,055 | 5/1968 | U.S.S.R. | 106—52 |

OTHER REFERENCES

Stanworth, "Tellurite Glasses," J. Soc. Glass Tech. *36*, 217 (1952).

Dennis et al., "Germanium Glasses," J. Soc. Glass Tech. *9*, p. 184 (1925).

Rawson, H., Inorganic Glass-Forming Systems (1964), pp. 187–8, TP857 R3.

HELEN M. McCARTHY, Primary Examiner

U.S. Cl. X.R.

106—47 Q

PO-1050
(5/69)

UNITED STATES PATENT OFFICE
CERTIFICATE OF CORRECTION

Patent No. 3,826,661  Dated July 30, 1974

Inventor(s) E. J. Greco    J. M. Wylot

It is certified that error appears in the above-identified patent and that said Letters Patent are hereby corrected as shown below:

Column 3, line 16    Delete "$n_S$" and substitute therefor --$n_D$--

Column 5, line 10    Delete "6.0" and substitute therefor --5.0--

Signed and sealed this 19th day of November 1974.

(SEAL)
Attest:

McCOY M. GIBSON JR.
Attesting Officer

C. MARSHALL DANN
Commissioner of Patents